INVENTOR
BRADFORD C. WHITE

INVENTOR
BRADFORD C. WHITE

United States Patent Office 3,694,351
Patented Sept. 26, 1972

3,694,351
CATALYTIC PROCESS INCLUDING CONTINUOUS CATALYST INJECTION WITHOUT CATALYST REMOVAL
Bradford C. White, Pittsburgh, Pa., assignor to Gulf Research & Development Company, Pittsburgh, Pa.
Filed Mar. 6, 1970, Ser. No. 17,064
Int. Cl. C10g 23/02
U.S. Cl. 208—213      5 Claims

ABSTRACT OF THE DISCLOSURE

The hydrodesulfurization of a crude oil or a reduced crude containing the asphaltene fraction proceeds at unexpectedly low temperatures by utilizing a catalyst comprising a Group VI and Group VIII metal on alumina wherein the catalyst particles are very small and have a diameter between about $1/20$ and $1/40$ inches, and the feed is passed in downflow operation over a fixed bed of the catalyst. The low temperature advantage depends upon high hydrogen pressure and the process is pressure drop-limited rather than catalyst activity limited. The present invention presents a two pronged attack on pressure drop. First, plugging at the top of the catalyst bed and coincident increase in pressure drop is prevented by starting the reaction with only a portion of the total catalyst required for a full cycle and injecting fresh catalyst to the top of the catalyst bed while the reaction is in progress without removing any catalyst from the process. Furthermore, disregardnig plugging, pressure drop due to the small particle size of the catalyst is retarded since the total catalyst load is not introduced until the catalyst cycle is near an end. In this manner, the smallest amount of catalyst is present when the catalyst is most active and the greatest amount of catalyst is not present until the catalyst is least active. This invention can be applied to other fixed bed processes wherein fouling at the top of the bed or pressure drop represents a process limitation and wherein freshly injected catalyst can perform as a filtering medium in addition to performing a catalytic function.

---

The present invention relates to downflow fixed bed catalytic processes wherein solids deposition or fouling at the upper surface of the fixed catalyst bed during downflow of liquid and/or vapor constitutes a process limitation. The method comprises starting the process with less than the full load of catalyst required for the entire catalyst cycle and adding catalyst during the operation without any catalyst removal so that the full catalyst load is only approached as the catalyst cycle proceeds to conclusion. This invention is particularly directed to processes which are pressure drop-limited rather than catalyst activity limited and it reduces pressure drop into two respects, viz., it reduces the average load of catalyst in the system and it reduces fouling in the catalyst.

The present invention in its preferred embodiment relates to a process for the hydrodesulfurization of a crude oil or a reduced crude oil in the presence of a supported Group VI and Group VIII metal hydrodesulfurization catalyst having an exceptionally small particle size. Substantially all or a large proportion of the catalyst particles of the preferred embodiment of the present invention have a diameter of between about $1/20$ and $1/40$ inches. From the following description of the hydrodesulfurization process it will be seen that it is particularly pressure drop-limited and therefore particularly improved by the method of this invention.

Although nickel-cobalt-molybdenum is the preferred active metals combination for the hydrodesulfurization catalyst of the preferred embodiment of this invention, other combinations can be utilized such as cobalt-molybdenum, nickel-tungsten and nickel-molybdenum. Alumina is the preferred supporting material but other non-cracking supports can also be used such as silica alumina and silica magnesia.

Hydrodesulfurization catalysts comprising supported Group VI and Group VIII metals, such as nickel-cobalt-molybdenum on alumina, having a particle size as small as the catalyst particles of the preferred embodiment present invention were not generally considered advantageous for use in a large or commercial scale because a bed comprising particles of the small size of the preferred embodiment of the present invention induces an extremely high pressure drop, which is highly deleterious to a hydrodesulfurization process which has a limited inlet pressure because the temperature required by a catalyst to accomplish a given degree of desulfurization increases with loss of hydrogen pressure.

The preferred embodiment of the present invention relates to a hydrodesulfurization process in which the small particle size catalyst is utilized in a manner which manifests an unexpectedly high activity so that hydrodesulfurization of crude oil charge to any desired sulfur level, such as a 1 percent sulfur level, proceeds at an unexpectedly low temperature. Although extrapolation of the initial temperature required to produce a liquid product having a 1 percent sulfur content with $1/8$ inch diameter and $1/16$ inch diameter NiCoMo catalyst particles, which are above the size of the preferred embodiment of the present invention, indicates that the temperature requirement would be lower with the small catalyst particles of the preferred embodiment of this invention, it was found that the small size NiCoMo catalyst particles of the preferred embodiment permit the use of a hydrodesulfurization temperature which is considerably lower than the temperature which would be expected by extrapolation of the temperature data obtained with larger size catalyst particles. Moreover, the very discovery that hydrodesulfurization with the small catalyst particles could be carried out at an unexpectedly low temperature had been obscured by the extremely high pressure drop through a bed of the small size catalyst particles. The reason is that in a hydrodesulfurization process pressure drop itself increases the temperature requirement to achieve a given degree of desulfurization usually by an extent which equals or exceeds the temperature advantage due to the small particle size.

Figure 1:
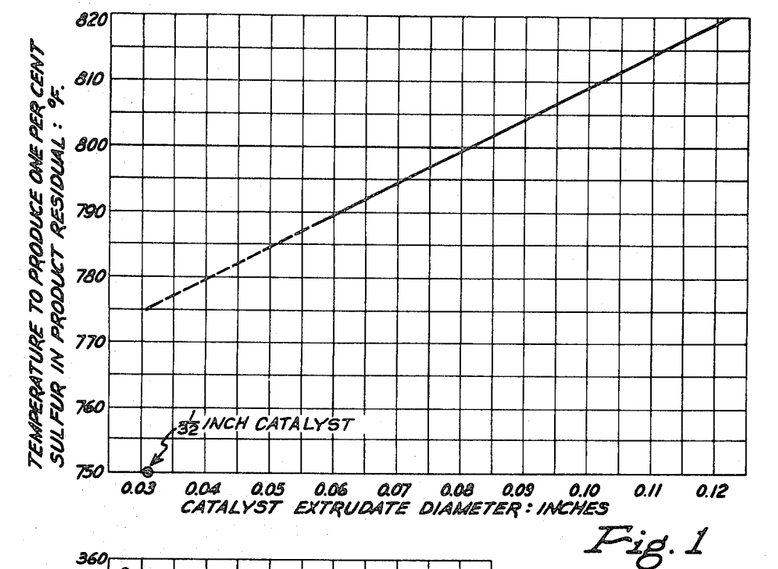
Figure 2:
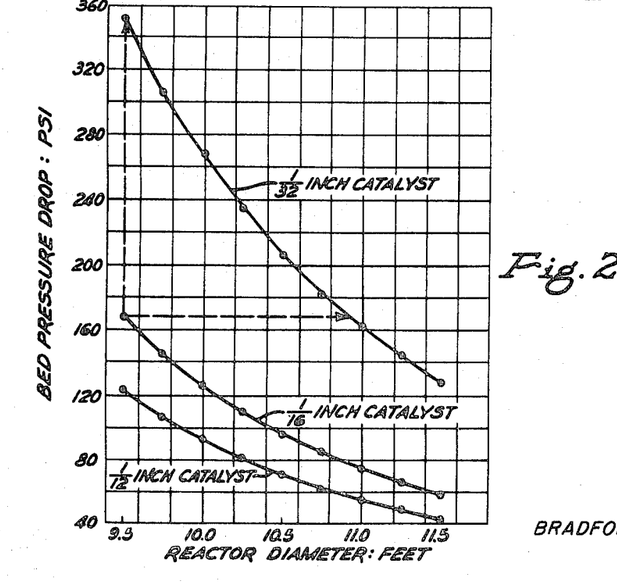

It is seen that there are two unexpected features surrounding the hyldrodesulfurization process. The first is that there is an unexpectedly great temperature advantage achievable in a hydrodesulfurization process by employing a bed of catalyst having a particle size of the present invention. FIG. 1 (all figures are discussed in detail herein below) shows that the hydrodesulfurization temperature required to produce a residual product having 1 percent sulfur with a $1/32$ inch catalyst is much lower than what would be expected by extrapolation of the line connecting the data obtained with $1/8$ and $1/16$ inch catalyst particles even though the surface area defined by the pores of all three catalysts is about the same. The second feature is that the unexpected temperature advantage is completely disguised by the ordinary approach to its determination, i.e. by making a test in a reactor with relatively large size catalyst particles as a blank and then making a test in the same reactor under the same conditions except that the catalyst particle size is within the range of the preferred embodiment of the present invention (particle size being the only variable changed in the two tests). In this regard, the vertical dashed line in FIG. 2 shows that if a $1/16$ inch catalyst, which is larger than a catalyst of the preferred embodiment of this invention, is tested in a 9.5 foot diameter reactor and then a 1/32 inch catalyst is tested in the same reactor under unchanged conditions, including an unchanged space velocity, the pressure drop in the 1/32 inch catalyst bed in the same reactor is so much greater than that for the 1/16 inch catalyst that the pressure drop increase itself would easily nullify the temperature advantage achieveable because of particle size and therefore the advantage would be completely masked. The horizontal dashed line of FIG. 2 shows that if the 1/16 inch catalyst is tested in a 9.5 diameter reactor a comparable pressure drop can only be achieved if the 1/32 inch catalyst is tested in an 11 foot diameter reactor, when both tests are performed at a liquid hourly space velocity of one. Therefore, it is only by making the tests in two different reactors, to equalize pressure drop, that the temperature advantage of the 1/32 inch catalyst becomes apparent. It is clear that not merely one but rather two variables must be changed to reveal the advantage of the preferred embodiment of the present invention.

Figure 3:
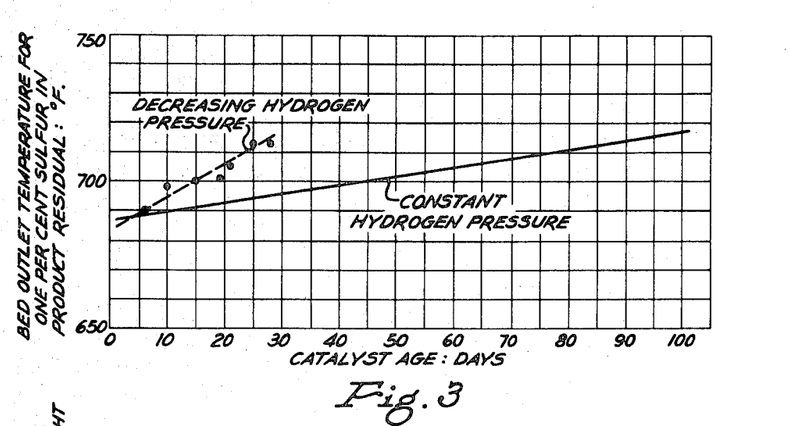

The great effect of pressure drop upon temperature requirements to produce a hydrocarbon product having a 1 percent sulfur content is demonstrated by reference to FIG. 3. In FIG. 3 the solid line represents a hydrodesulfurization process having a constant hydrogen partial pressure of 1830–1850 p.s.i.a. The dashed line represents a decreasing hydrogen partial pressure starting with the 1830–1850 p.s.i.a. range to a range of 1720–1740 p.s.i.a. which reduction is caused by the recycle hydrogen stream becoming progressively diluted with other gases. FIG. 3 shows that as the hydrogen partial pressure progressively decreases the temperature required to produce a 1 percent sulfur product progressively increases, so that it is considerably above the temperature required with constant hydrogen partial pressure. Since pressure drop due to flow across a catalyst bed similarly reduces partial hydrogen pressure, FIG. 3 illustrates the detrimental effect upon reaction temperature of pressure drop.

The charge to the hydrodesulfurization process can be a full crude or a reduced crude containing substantially all of the residual asphaltenes of the full crude. The residual asphaltenes are deficient in hydrogen and comprise only about 10 percent of the charge oil but contain substantially all of the metallic components present in the crude, such as nickel and vanadium. Since the desulfurization catalyst has a greater activity for demetalization than for desulfurization, it removes nickel and vanadium from a charge stock more rapidly than it removes sulfur. These metals deposit most heavily on the outermost regions of the catalyst cross-section and tend to reduce the desulfurization activity of the catalyst. Nickel and vanadium removal constitutes substantially the entire deactivation of the catalyst while sulfur and nitrogen removal contributes very little to catalyst deactivation. Furthermore, the asphaltenes comprise the highest boiling fraction of the full crude and contain the largest molecules in the crude. These large molecules are the ones least able to penetrate catalyst pores and most likely to plug these pores. The preferred embodiment of the present invention is directed towards the hydrodesulfurization of a full crude or a residual oil containing substantially the entire asphaltene fraction of the crude from which it is derived and which therefore contains 95 to 99 weight percent or more of the nickel and vanadium content of the full crude. The nickel, vanadium and sulfur content of the liquid charge can vary over a wide range. For example, nickel and vanadium can comprise 0.002 to 0.03 weight percent (20 to 300 parts per million) or more of the charge oil while sulfur can comprise about 2 to 6 weight percent or more of the charge oil. If an oil containing smaller quantities of nickel, vanadium and sulfur is processed, such as a furnace oil, considerably lower temperature conditions, pressures as low as 1000 pounds per square inch, lower gas circulation rates and hydrogen of lower purity than required by this invention, will suffice to produce a liquid product containing 1 percent sulfur, and therefore the process of the preferred embodiment of the present invention will not be essential.

As the hydrodesulfurization reaction proceeds, nickel and vanadium removal from the charge tends to occur preferentially over sulfur removal. However, deposition of nickel and vanadium upon the catalyst results in a greater degree of catalyst deactivation than does sulfur removal because the removed metals deposit upon the catalyst whereas sulfur removed from the charge escapes as hydrogen sulfide gas. Low hydrodesulfurization temperatures tend to inhibit metal removal from the charge and thereby reduce catalyst deactivation. Since the hydrodesulfurization reaction is exothermic, it is important to quench the reactor to maintain a reaction temperature as low as the small catalyst size permits to obtain the desired degree of desulfurization in order to inhibit catalyst deactivation. Unnecessarily high temperatures by encouraging catalyst deactivation will result in loss of the initial temperature advantage of the catalyst. Quenching is advantageously accomplished by dividing the total catalyst bed into a plurality of relatively small beds in series and injecting relatively cool hydrogen between the beds, as demonstrated below. It is seen that there is a high degree of interdependence between the use of a high metals content asphaltene charge, the small size catalyst particles, and the use of a quench to insure that the reactor remains at a temperature as low as the catalyst size permits.

The hydrodesulfurization process of the preferred embodiment of this invention employs conventional reaction conditions such as, for example, a hydrogen partial pressure of 1,000 to 5,000 pounds per square inch, generally, 1,000 to 3,000 pounds per square inch, preferably, and 1,500 to 2,500 pounds per square inch most preferably. Reactor design limitations usually restrict inlet pressures under the conditions of the present invention to not more than 2,000, 2,500, or 3,000 p.s.i.g. It is the partial pressure of hydrogen rather than total reactor pressure which determines hydrodesulfurization activity. Therefore, the hydrogen stream should be as free of other gases as possible. Furthermore, since reactor design limitations restrict hydrogen inlet pressures, hydrogen pressure drop in the reactor should be held as low as possible.

The gas circulation rate can be between about 2,000 and 20,000 standard cubic feet per barrel, generally, or preferably about 3,000 to 10,000 standard cubic feet per barrel of gas preferably containing 85 percent or more of hydrogen. The mol ratio of hydrogen to oil can be between about 8:1 and 80:1. Reactor temperatures can range between about 650 and 900° F., generally, and between about 680 and 800° F., preferably. The temperature should be low enough so that not more than about 10, 15 or 20 percent of the charge will be cracked to furnace oil or lighter. At temperatures approaching 800° F. the steel of the reactor walls rapidly loses strength and unless reactor wall thicknesses of 7 to 10 inches or more are utilized a temperature of about 800° F. constitutes a metallurgical limitation. The liquid hourly space velocity in each reactor of the hydrodesulfurization process can be between about 0.2 and 10, generally, between about 0.3 and 1 or 1.25, preferably, or between about 0.5 and 0.6 most preferably.

The catalyst employed in the process is conventional and comprises sulfided Group VI and Group VIII metals on a support such as nickel-cobalt-molybdenum or cobalt-molybdenum on alumina. Hydrodesulfurization catalyst compositions suitable for use in the preferred embodiment of the present invention are described in U.S. 2,880,171 and also in U.S. 3,383,301. However, an essential feature of the catalyst particles is that the smallest diameter of these particles is considerably smaller than the diameter of conventional hydrodesulfurization catalyst particles. The smallest diameter of the catalyst particles is broadly between about 1/20 and 1/40 inches, preferentially between 1/25 and 1/36 inches, and most preferably between about 1/29 and 1/34 inches. Particle sizes below this range would induce a pressure drop which is too great to make them practical. The catalyst can be prepared so that nearly all or at least about 92 or 96 percent of the particles are within this range. The catalyst can be in any suitable configuration in which the smallest particle diameter is within this range such as roughly cubical, needle-shaped or round granules, spheres, cylindrically-shaped extrudates, etc. By smallest particle diameter is meant the smallest surface to surface dimension through the center or axis of the catalyst particle, regardless of the shape of the particle. The cylindrical extrudate form having a length between about 1/10 and 1/4 inches is highly suitable.

Since the asphaltene molecules which are hydrodesulfurized are large molecules and must enter and leave the pores of the catalyst without plugging the pores, in order to obtain good aging properties most of the pore volume of the catalyst should be in pores above 50 A. in size. Advantageously 60 to 75 percent or more of the pore volume should be in pores of 50 A. or more. Most preferably, 80 to 85 percent or more of the pore volume should be in pores above 50 A. in size. Catalysts having smaller size pores have good initial activity but poor aging characteristics due to gradual plugging of the pores by the asphaltene molecules. For example, catalyst A below exhibited good activity for about one month while catalyst B below exhibited good activity for about three months.

| Pore size, A.: | Catalyst A, percent of pore volume | | Catalyst B, percent of pore volume | |
|---|---|---|---|---|
| 200–300 | 1.2 | | 2.3 | |
| 100–200 | 4.3 | 21.7 | 41.7 | 87.3 |
| 50–100 | 16.2 | | 43.3 | |
| 40–50 | 16.4 | | 6.4 | |
| 30–40 | 22.6 | | 5.6 | |
| 20–30 | 26.6 | | 1.0 | |
| 7–20 | 12.5 | | 0.0 | |

As indicated, as the diameter of conventional hydrodesulfurization catalyst particles progressively decreases within a range which is above the range of the preferred embodiment of the present invention, hydrodesulfurization of a crude oil to a one percent sulfur level proceeds at progressively lower temperatures. However, the following tests show that the diminishing of catalyst diameter size to a level within the range of the preferred embodiment of the present invention results in an unexpectedly great reduction in hydrodesulfurization temperature which is much greater than indicated by the particle diameter-temperature relationship exhibited by larger size particles. However, counteracting this temperature advantage is the fact that the small catalyst particle diameters result in a large pressure drop through a catalyst bed comprising them, and this pressure drop tends to nullify the temperature advantage achievable with the catalyst because hydrodesulfurization temperature requirements increase as hydrogen partial pressures decrease.

Although it is expected that reduction in catalyst particle size will increase pressure drop, we have found that under desulfurization conditions the increase in pressure drop occasioned by using a bed of catalyst particles of the size of the preferred embodiment of this invention as compared to a bed of catalyst particles only slightly larger than those of the preferred embodiment of this invention is great within reactors having moderate diameters. As shown in FIG. 2 the increase in pressure drop occasioned by utilizing the catalyst size of the preferred embodiment of the present invention as compared to slightly higher catalyst sizes can be greatly moderated by utilizing a reactor having a very high diameter such as 10 or 11 feet or more. However, high pressure reactors having large diameters require extremely thick walls, especially under the elevated temperature conditions of the process.

As indicated above, in the temperature vicinity of 800° F. which is required for hydrodesulfurization of crude oil or reduced crude oil a considerable metallurgical weakening occurs in the steel reactor walls. In order to guard against reactor failures at the 2,000 or 2,500+ pounds per square inch operating pressures of the process extremely thick steel walls are required, for example, a thickness of 8, 10 or 12 inches. At the reaction temperatures of the hydrodesulfurization process the required reactor wall thickness increases appreciably with relatively small increases in reactor inlet pressure. Furthermore, at any temperature or pressure of the preferred embodiment of this invention the wall thickness required also increases with reactor diameter. Therefore the excessive increase in reactor wall thickness which is required upon any increase in reactor diameter or reactor temperature exerts a practical design limitation upon maximum allowable pressure in a reactor.

The existence of a maximum pressure limitation tends to be prohibitive to the use of a hydrodesulfurization catalyst having a small diameter because a bed comprising such a small catalyst induces a very high pressure drop, diminishing still further the average pressure within the reactor and the magnitude of this pressure drop is closely related to reactor diameter. For example, FIG. 2 shows that the pressure drop curves for 1/12 inch, 1/16 inch and 1/32 inch catalyst beds are roughly parallel at reactor diameters of 11 feet or greater. However, the pressure drop curve for the 1/32 inch catalyst is much steeper at reactor diameters less than 11 feet than the pressure drop curves for the 1/12 and 1/16 inch catalyst. Therefore, for a catalyst of the hydrodesulfurization process of the present invention the diameter of the reactor within the range of conventional reactor sizes has an important effect upon pressure drop.

Since there is a practical limit on reactor inlet pressure, as explained above, due to reactor wall thickness requirements, it is important to hold pressure drop in the reactor as low as possible. In effect there is a pressure squeeze in the system in that inlet hydrogen pressure should be held down while reactor outlet pressure should be as high as possible. Therefore, in reactors having an inlet pressure limitation of about 2,000, 2,500 or 3,000 p.s.i.g., the diameter to depth ratio of the catalyst bed should be high enough to reduce pressure drop so that the reactor outlet pressure is not more than about 150, 250 or 350 p.s.i.g. lower than the inlet pressure. Control of reactor pressure differential with a high diameter to depth ratio catalyst bed is especially important in single reactor systems capable of accepting only relatively low inlet pressures. The diameter to depth ratio becomes less important in reactors which can accept relatively high inlet pressures or in parallel reactor systems wherein pressure drop can be reduced by diverting a portion of reactant flow to another reactor.

There is an additional problem relating to pressure drop arising when utilizing the very small catalyst particles that is alleviated considerably by utilizing a large diameter reactor or parallel reactors. When catalyst particles have the very small size as stated, reactant flow through them causes them to shift and scrape against each other in a process of compaction. Scrapping of particles against one another result in production of fines which further increases pressure drop. Since a catalyst bed may be in continuous operation for long periods of time, production of fines can be considerable. The use of a large diameter reactor or a parallel reactor system, by permitting a greater catalyst cross-section per volume of reactor flow, inhibits fines formation and thereby inhibits an increasing pressure drop across the catalyst field due to this cause.

A hydrodesulfurization catalyst whose diameter is between 1/20 and 1/40 inches which provides an unexpected and substantial temperature advantage due to its size but whose size also induces a large pressure drop in reactors of common or standard size which pressure drop tends to nullify said temperature advantage can be arranged in a bed having a sufficiently large diameter to depth ratio to preserve the temperature advantage due to catalyst size. The catalyst can be advantageously divided into separate beds arranged in series to form a reactor train with each succeeding bed in series containing a greater quantity of catalyst than its preceeding bed. The total liquid charge stream comprising crude oil or reduced crude oil together with a portion of total hydrogen requirements is charged to the reactor inlet. An effluent stream comprising desulfurized liquid together with gases is withdrawn from the reactor and cooled. Liquid and gases are separated from each other in the cooled effluent stream. Impurities are removed from said effluent gases to provide a recycle hydrogen stream having an increased proportion of hydrogen. The recycle hydrogen is recycled to a plurality of positions in series in the reactor between the separate catalyst beds therein.

Figure 4:
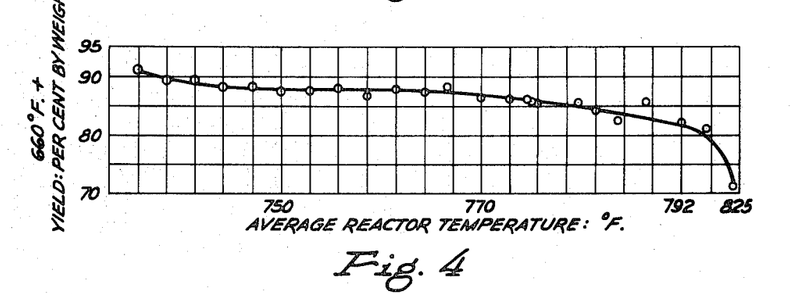

The diameter of the catalyst bed should be adequate to reduce the pressure drop across the catalyst bed sufficiently to permit the reaction to occur near the low temperature level permitted by the small catalyst size. The apportioning of the recycle hydrogen to separate positions in the reactor train rather than total recycle of the hydrogen to the beginning of the reactor serves to minimize overall hydrogen pressure drop in the system. Finally, the apportioning of the recycle hydrogen so that it is injected between the separate catalyst beds permits it to serve as a quench to cool the flowing stream as it passes between catalyst beds, thereby permitting reaction temperature to remain near the low temperature level permitted by the small catalyst size. In the absence of a hydrogen quench as described the temperature increase of reactants across each bed would become cumulative so that neither deep beds nor a number of beds in series could be used. Furthermore, temperatures even slightly higher than necessary are detrimental because, as shown in FIG. 4, moderate temperature elevations considerably enhance thermal cracking of liquid producing among other products light hydrocarbon gases which dilute the hydrogen stream and reduce the partial pressure of hydrogen therein.

The hydrogen quench by reducing the actual temperature also reduces the required temperature and therefore cooperates interdependently with the small catalyst particles of this invention. By lowering the temperature, the hydrogen quench reduces cracking which would consume hydrogen and produce light hydrocarbon gases leading to a lower hydrogen concentration, which in turn would reduce the hydrogen partial pressure and increase the required reaction temperature.

It is seen that the feature of catalyst beds having a high diameter to length ratio arranged as a plurality of separate catalyst beds in series and the feature of recycle hydrogen injection between the separate catalyst beds function highly interdependently with respect to each other and with respect to the use of the small catalyst particle size. The small catalyst particle size permits hydrodesulfurization to occur at an unexpectedly low temperature level but imposes a high pressure drop which tends to nullify the temperature advantage. The use of a catalyst bed having a large diameter reduces the pressure drop in the liquid flow stream while the use of separated catalyst beds in series with injection of recycle hydrogen between the beds serves not only to reduce the pressure drop of the hydrogen flowing through the system but also serves to quench reactant temperature along the length of the reactor. As stated above, the quenching effect inhibits thermal cracking of liquid and thereby avoids hydrogen consumption for cracking and excessive dilution of the hydrogen stream with light hydrocarbon gases which would reduce the partial pressure of the hydrogen stream, thereby also tending to nullify the advantageous temperature effect of the small particle size catalyst.

As shown in FIG. 2, at reactor diameters below about 11 feet, the pressure drop through the $\frac{1}{32}$ inch catalyst bed increases extremely rapidly with reduction in reaction diameter at the indicated space velocity. However, in the diameter range shown the pressure drops through a $\frac{1}{16}$ inch catalyst bed and a $\frac{1}{12}$ inch catalyst bed, which are both above the range of this invention, are not nearly as sensitive to reduction in reactor diameter below 11 feet. FIG. 2 also shows that at reactor diameters above 11 feet the pressure drop through a $\frac{1}{32}$ inch catalyst bed is not significantly more sensitive to changes in reactor diameter than are the pressure drops through the $\frac{1}{12}$ inch and $\frac{1}{16}$ inch catalyst beds. Therefore, there is a much more sensitive pressure drop relationship between a $\frac{1}{32}$ inch catalyst bed at the reactor diameters shown in FIG. 2 than there is with beds of larger size catalyst particles. However, at the high temperature and pressure conditions of the hydrodesulfurization process metallurgical requirements require reactor walls of great thickness at reactor diameters of 11 feet or more, reactor wall thickness requirements increasing with increasing reactor diameter, so that economic considerations prohibit reactor diameters much larger than 11 feet in the process of this invention. Therefore, with a $\frac{1}{32}$ inch catalyst bed in order to accommodate charge rates which would require a reactor diameter much greater than 11 feet, it is necessary to utilize a parallel reactor system. FIG. 2 clearly indicates that at the indicated space velocity and with the reactor diameters shown a criticality regarding pressure drop sensitivity arises when employing a $\frac{1}{32}$ inch catalyst bed which is far greater than in the case of the $\frac{1}{12}$ inch and a $\frac{1}{16}$ inch catalyst bed.

All of the tests indicated in FIG. 2 for the various catalyst sizes were made at the same liquid hourly space velocity. Therefore, in the tests within a reactor of relatively large diameter, the catalyst bed depth was relatively shallow. In the tests within a reactor of relatively small diameter, the catalyst bed was deeper. FIG. 2 shows that in utilizing a $\frac{1}{32}$ inch catalyst rather than a larger size catalyst, the catalyst bed configuration must provide a diameter which is sufficiently great that the pressure drop is held at a level low enough to retain the advantage of the lower hydrodesulfurization temperature possible with said catalyst. Therefore, when utilizing a bed of small size catalyst particles, the configuration of the bed is important and the ratio of diameter to depth of the bed must be sufficiently high to retain the temperature advantage of the catalyst bed.

In its preferred embodiment, the present invention provides a means for reducing the pressure drop across the catalyst bed in a hydrodesulfurization operation, regardless of the configuration of the catalyst bed, thereby tending to enhance the temperature advantage of a small particle size catalyst. In accordance with this invention the reaction is initiated with only a portion of the total catalyst required for a full catalyst cycle; i.e. with only about 30, 40, 50, 60 or 75 percent of the total amount of catalyst required for the entire run duration. As explained above, the small size of the catalyst particles permits a reduced temperature to accomplish any given degree of desulfurization at a given pressure, but this advantage is only maintained as long the inlet hydrogen pressure is not dissipated by pressure drop. It was explained that the reduced temperature advantageously inhibits the rate of demetalization. However, some demetalization and its concomitant deactivation of catalyst cannot be avoided. The demetalization results in an accumulation of metallic deposits upon the surface of the catalyst and while this accumulation extends through the bed depth it is especially heavy in the uppermost layer of the small particle size catalyst bed and tends to diminish with bed depth.

The small catalyst particle size provides relatively small interstitial spaces between adjacent catalyst particles for passage of a liquid-vapor mixture of hydrocarbon together with hydrogen. As the reaction proceeds accumulation of metallic deposits upon the surface of the catalyst further reduces the clearances between adjacent catalyst particles particularly at the uppermost layer of the bed until the uppermost layer of the bed effectively becomes a filter for solids carried by the crude or reduced crude feed. When this occurs, the solids in the feed oil become entrapped between adjacent catalyst particles at the uppermost region of the catalyst bed, i.e. the uppermost 1 to 5 percent of the bed, crust formation occurs and a significant pressure drop ensues across this crust.

Because the feed to the preferred embodiment of this invention is a crude oil or a reduced crude it contains not only nearly all of the metals, such as, nickel and vanadium, but also nearly all of the solids originally present in the crude, which solids principally include carbon, various salts and iron compounds. At the outset of operations the clearances between adjacent catalyst particles in the small particle size catalyst bed is sufficiently great for these suspended solids to pass through the bed substantially unobstructed, without crust formation occurring and without a detectable pressure drop increase due to trapping of solids within the catalyst bed. It is evidently due to reduced clearances between adjacent catalyst particles caused by gradual metal accumulation upon the catalyst that eventually causes the bed to become a filter for incoming solids. Therefore, it is only after an extended period of operation that crust formation occurs before which no pressure drop increase due to this effect is observable and after which a pressure drop increase becomes rapidly discernible.

There is a high degree of feedback between the onset of crust formation and the furtherance of catalyst metal contamination. It has been shown above that metals removal from the feed oil is inhibited by the lower temperatures permitted by the small particle size catalyst. However, when gradual accumulation of metals triggers filter formation with ensuing solid entrapment, the resultant increase in pressure drop necessitates a higher operating temperature (see FIG. 3). The higher temperature in turn accelerates metal accumulation on the catalyst. It is seen that the problem feeds upon itself. Therefore, the purpose of this invention is to delay or prevent inception of filter bed conditions.

It is obvious from the foregoing discussion that the hydrodesulfurization process is not limited by catalyst activity, as is most catalytic processes, but rather by pressure drop. It will be appreciated that the present invention provides a two-pronged attack on pressure drop. The first is by retarding encrustation in the catalyst bed as described above. The second is by operating the process with less than the total required amount of catalyst for most or nearly all of the catalyst cycle. In accordance with the present invention the entire catalyst cycle operates with less than a full load of catalyst and it is not until the catalyst cycle is near an end that the final catalyst increment is introduced. In this manner the smallest amount of catalyst is present when the catalyst is most active and the greatest amount of catalyst is not present until the catalyst is least active. Since the small particle size of the catalyst imparts a considerable pressure drop even in the absence of consideration of encrustation effects, this second feature is important to the present invention.

The present invention provides a method for preventing or delaying the described process-limiting crust formation and thereby permitting the process to be operated for an extended period at the low temperature permitted by the small particle size of the catalyst, thereby extending the cycle life of the catalyst. In accordance with the preferred embodiment of the present invention, before the onset of a catalyst cycle the reactor is filled with only a portion of the total amount of the small particle size catalyst, such as $\frac{1}{32}$ inch catalyst, which will be required to complete the run. The hydrocarbon (liquid and vapor) and hydrogen reactants are then passed downflow through the start-up quantity of catalyst, disposed in a fixed bed, for an extended duration. After a considerable quantity of metal has accumulated on the catalyst surface but before the upper portion of the catalyst bed becomes a filter and is encrusted by entrapped solids contained in the feed, as evidenced by an increase in pressure drop, additional fresh, active catalyst is added to the reactor system in advance of or above the start-up catalyst bed. No catalyst is removed from the system during a catalyst cycle so that there is a continuous or intermittent increase in catalyst in the reactor during the process.

The additional catalyst can be injected into the system in various ways either continuously or intermittently and without stopping hydrocarbon and hydrogen flow or in any way interrupting the hydrodesulfurization process. An advantageous manner of injecting catalyst is to continuously inject a small amount of small catalyst particles, such as $\frac{1}{32}$ inch catalyst particles, into the crude or reduced crude liquid feed line to the reactor. Injecting fresh catalyst in this manner permits the total catalyst bed to operate as an effective filter in addition to performing its catalytic function. The freshly added catalyst permits solids entrapment be distributed over an enlarged portion of the bed depth, rather than only at the upper layer of the bed. The amount of catalyst injected should be small so that the liquid feed provides a medium for protecting the incoming catalyst against mechanical damage conducive to fines formation. If excessive fines formation occurs during injection of fresh catalyst, the injection operation could result in a net enhancement of pressure drop contrary to the purpose of this invention. Therefore, in normal operation only about 1 ounce of catalyst need be injected per barrel of hydrocarbon feed. There will be an advantage even if the amount of catalyst is very low, e.g. about 0.1 ounce of catalyst per barrel. In general, between about 1 ounce and four pounds of catalyst per barrel of hydrocarbon feed represents a suitable injection rate while between about 1 ounce and six ounces of catalyst per barrel of hydrocarbon feed represents a preferable injection rate. If the catalyst is intermittently rather than continuously injected the injection rate can be appropriately adjusted. A similar adjustment in catalyst injection rate can be made if the period of catalyst addition is delayed after the reactor is started up.

When a start-up catalyst bed becomes encrusted or plugged in the absence of the method of this invention, the plugging effect occurs nearly entirely in about the top one percent of the volume of the catalyst bed, and rarely extends beyond the top 5 percent of the catalyst bed. The top of the catalyst bed is therefore the front at which the filtering effect arises. In accordance with the method of the present invention the injection of fresh catalyst can be delayed until appreciable metals deposition has occurred but is initiated well before metals deposition is sufficiently advanced to create a filter at the top of the bed. When fresh catalyst injection begins, there is a slow and continuous formation of catalyst layer at the top of the bed so that the front at which encrustation is most likely to occur is slowly but continuously removed from the top of the start-up bed. It is important that the injection of fresh catalyst should not be delayed so long that the original upper layer of the catalyst bed will ever become the zone at which filtration begins. Catalyst injection should begin sufficiently early in the total catalyst cycle that the new bed layer which forms above the top of the start-up bed will provide sufficient protection to the top of the original bed in terms of preremoval of metals and, if necessary, in terms of removal of solids that the top of the start-up bed will not subsequently constitute a zone of encrustation or significant pressure drop.

The above comments regarding the top of the start-up bed apply similarly to the top of each increment of catalyst bed formed via catalyst injection. If fresh catalyst is injected in one or more increments, the injection should never be interrupted sufficiently long that once catalyst injection is reinstituted the prior top of the catalyst bed will constitute a zone of encrustation and high pressure drop. The ultimate zone of encrustation or plugging should be at the utlimate top zone of the catalyst bed formed by the very last increment of injected catalyst. In this manner full utilization of the size of the reactor and of the injected catalyst can be approached. For best results, the timing of new catalyst injection against aging of older catalyst is apportioned so that maximum utilization of old catalyst is achieved without danger of the upper layer of the old catalyst bed ever constituting a filter and becoming encrusted.

In accordance with this invention an entire auxiliary catalyst bed can be in place at the start of a catalyst cycle but be by-passed by reactants until fresh catalyst is required. Thereupon, the auxiliary catalyst bed is put onstream merely by passing reactants through it in series with the original catalyst bed, without any interruption in reactant flow. A simulation based upon actual tests was made to illustrate the effect of adding a bed of fresh catalyst to the upstream end of a bed of $\frac{1}{32}$ inch nickel-cobalt-molybdenum on alumina catalyst which had been in desulfurization operation for 90 days. The additional catalyst added after 90 days of operation of the original bed was in place throughout the cycle and was added in a single increment by switching into the process without interrupting or otherwise disturbing the process. The fresh bed comprised the same type and particle size of catalyst as was contained in the original bed and constituted about 13 percent of the total catalyst ultimately utilized. The feed used was a reduced crude containing 4.0 weight percent sulfur and 70 p.p.m. of nickel and vanadium. The temperature of the process was at all times what was required to reduce the sulfur content to about 1 percent. The partial pressure of hydrogen in the system was 1850 p.s.i.g. and the liquid weight hourly space velocity after the fresh bed was switched into the process was 1.1. The results of the simulation test are illustrated in FIG. 9.

Figure 9:
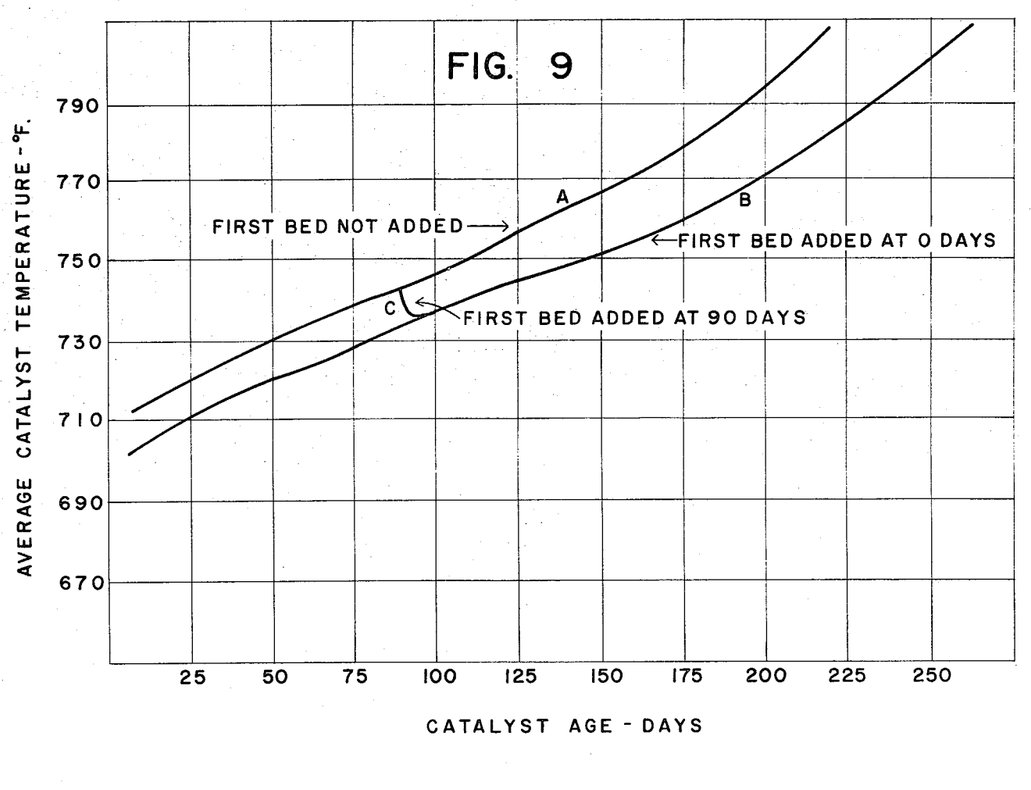

FIG. 9 shows the catalyst temperature required to produce a 1 percent sulfur level in the effluent at various catalyst ages. Curve A represents the required temperature in an operation wherein the auxiliary bed is never added. Curve B represents the required temperature when the first bed was present from the start-up and because of the greater amount of catalyst present throughout, curve B represents a lower temperature than curve A. Curve C indicates a process wherein the first bed is not present at the outset but is added after 90 days of operation at which time the required temperature drops from the level of curve A to the level of curve B. FIG. 9 shows that in accordance with the present invention any temperature advantage surrendered at the beginning of a run is recovered at the end of the run.

The method of starting a process with less than the full amount of catalyst and adding catalyst during the operation so that the full catalyst load is only approached as the catalyst cycle proceeds to conclusion is especially applicable to the hydrodesulfurization process described which is pressure drop-limited rather than catalyst activity-limited since the present method provides a two-pronged attack upon pressure drop as explained above. However, the present method can be applied to other processes wherein solids deposition or fouling at the upper surface of a fixed catalyst bed during downflow of liquid and vapor can be a problem or where pumping costs can be conserved by operating with less than a full catalyst bed during most of the cycle. An example of another process wherein crust formation on the top of a fixed catalyst bed is a problem in the hydrogenation of aromatic distillate with a Group VI and Group VIII metal catalyst. Aromatic distillate is a naphtha range aromatic-containing material produced as a by-product in the high temperature cracking of ethane to naphtharange hydrocarbon to ethylene. Other processes to which the present invention can be applied include the hydrocracking of crude and other oils and hydrofining processes for the production of lubricating oils wherein the hydrocarbon feed contains contaminative solids.

EXAMPLE 1

A series of tests were conducted to illustrate the temperature advantage of a small particle size hydrodesulfurization catalyst. These tests were conducted by employing NiCoMo on alumina catalysts of various sizes for hydrodesulfurizing a 36 percent Kuwait reduced crude from which furnace oil having an 800° F. TBP had been removed at a 2000 p.s.i.a. partial pressure of hydrogen and a space velocity of 3.0 liquid volumes per hour volume of catalyst. The charge was 78 percent desulfurized to a 1.0 percent product sulfur content. The arrangement of the reactor was such that there was no significant or readily detectable pressure drop in any of the tests. FIG. 1 shows the effect of catalyst size upon the initial temperature required to produce a product containing 1 percent sulfur. The solid line is based upon initial temperatures determined in tests with $\frac{1}{8}$ inch and $\frac{1}{16}$ inch diameter extrudate catalyst whose particle size is above the range of this invention. The dashed extrapolation of the solid line indicates that a $\frac{1}{32}$ inch diameter extrudate catalyst would be expected to require an initial temperature of about 775° F. However, FIG. 1 surprisingly shows that the $\frac{1}{32}$ inch diameter extrudate catalyst requires an initial temperature of only 750° F. It is noted that the surface area defined by the pores of all three catalysts tested is about the same. The position of the data point for the $\frac{1}{32}$ inch catalyst is highly surprising because if the dashed line in FIG. 1 were curved downwardly towards the $\frac{1}{32}$ inch catalyst data point the resulting curve would tend to indicate that as catalyst particle size becomes very small the activity of the catalyst becomes unlimited, which is obviously unreasonable. Therefore, the straight configuration of the dashed extension of the curve in FIG. 1 is a reasonable extrapolation of the solid line and the position of the $\frac{1}{32}$ inch data point is highly unexpected.

EXAMPLE 2

When catalysts similar to the $\frac{1}{32}$ inch catalyst of Example 1 except that the particle size is smaller within the range of this invention, such as $\frac{1}{32}$ or $\frac{1}{40}$ inch, or except that the particle size is larger within the range of this invention, such as $\frac{1}{29}$ or $\frac{1}{20}$ inch, are utilized under the conditions of Example 1, the initial temperature in each instance to achieve hydrodesulfurization to one percent sulfur is at about the same level as that shown in FIG. 1 for the $\frac{1}{32}$ inch catalyst.

EXAMPLE 3

When catalyst compositions other than NiCoMo on alumina, such as NiCoMo on silica alumina, CoMo on alumina, NiW on alumina, NiW on silica alumina, NiW on silica magnesia or NiMo on alumina having a particle size within the range of this invention are utilized under the conditions of Example 1 to achieve hydrodesulfurization to one percent sulfur, a similar unexpected temperature advantage is realized as compared to the extrapolated temperature based on larger size particles of the same composition.

EXAMPLE 4

Figure 5:
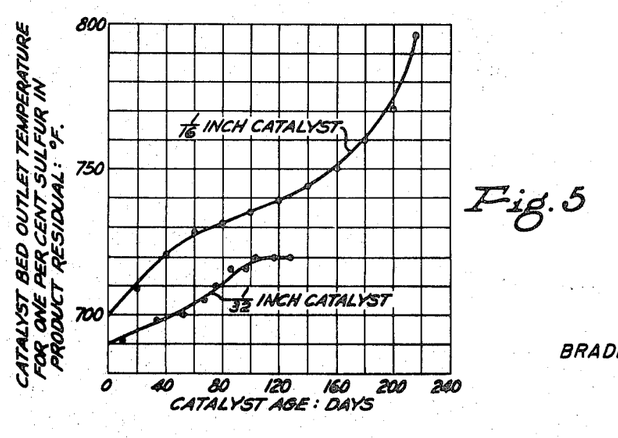
Figure 6:
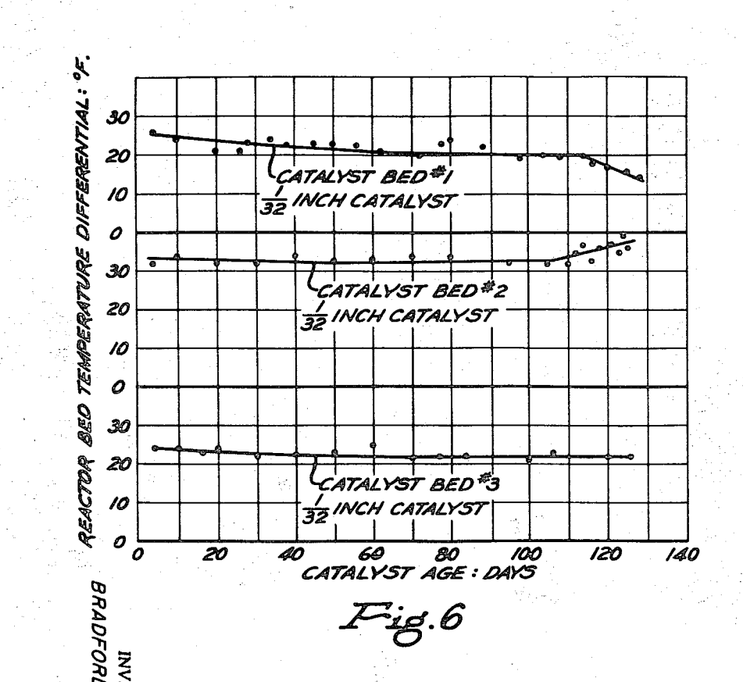

Tests were made which demonstrate that a $\frac{1}{32}$ inch nickel-cobalt-molybdenum on alumina extrudate is not only capable of hydrodesulfurizing a reduced crude oil to a one percent sulfur level at a considerably lower initial temperature than a similar catalyst in the form of a $\frac{1}{16}$ inch extrudate but also is capable of maintaining a lower hydrodesulfurization temperature with age. The tests with the $\frac{1}{32}$ inch catalyst were based on a 0.55 liquid hourly space velocity and a hydrogen partial pressure of 1830 pounds per square inch. The reactor pressure drop was about 50 pounds per square inch. The charge was a 50 percent Kuwait reduced crude. The reaction was performed in a single reactor having three separate beds and recycle hydrogen gas was used as a quench after each bed. There was no separate guard chamber before the reactor. The first, second and third beds contained 13.3 percent, 41.6 percent and 45.1 percent of the total catalyst, respectively. Typical data for the test utilizing the 1/32 inch catalyst are shown below and the general data is illustrated in FIGS. 5 and 6. FIG. 5 shows the aging characteristics for the entire 1/32 inch catalyst reactor as compared with a comparable aging run with a 1/16 inch catalyst reactor. FIG. 6 shows the aging characteristics for the individual beds within the 1/32 inch reactor and shows that when the first bed becomes deactivated the second bed assumes a greater desulfurization load.

The test utilizing the 1/16 inch nickel-cobalt-molybdenum on alumina catalyst was performed at a 1.1 liquid hourly space velocity, but is illustrated in FIG. 5 on a basis comparable to the 0.55 space velocity of the test made with the 1/32 inch catalyst. The total pressure for the 1/16 inch catalyst test was 2500 pounds per square inch gauge. 5000 s.c.f./bbl. of gas was charged to the reactor. The reactor contained four catalyst beds and recycle was used as a quench after each bed. The average reactor temperature was increased throughout the test to maintain a 1.0 percent by weight sulfur level in the 660° F.+ residual product. Typical data for both the 1/32 inch and the 1/16 inch catalyst tests are shown below.

|  | 1/32 inch catalyst | 1/16 inch catalyst |
|---|---|---|
| Oil charge | (1) | (1) |
| Catalyst | (2) | (3) |
| Volume, cc. | 2,294 | 2,254 |
| Weight, gram | 1,543.0 | 1,768.0 |
| Age, days this measurement | 97.6 | 87.6 |
| Total throughput, volume oil per volume catalyst | 1,293 | 2,323 |
| Operating conditions: |  |  |
| Reactor bed temp., ° F. (inlet, outlet) | 694,716 | -------- |
| Reactor pressure | 2,050 | 2,519 |
| Avg. Reactor Temp., ° F. | 703 | 784 |
| Space Velocity: |  |  |
| Vol./hr./vol. | 0.54 | 1.11 |
| Wt./hr./wt. | 0.78 | 1.36 |
| Reactor gas charge: |  |  |
| S.c.f./bbl. | 4,385 | 4,969 |
| Percent H₂ | 91 | 81 |
| Makeup gas: |  |  |
| S.c.f./bbl. | 890 | 735 |
| Percent H₂ | 93 | 95 |
| Recycle gas: |  |  |
| S.c.f./bbl. | 3,495 | 4,233 |
| Percent H₂ | 89 | 80 |
| Product yields, wt. percent: |  |  |
| Bottoms (660° F.+) | 91.1 | 84.7 |
| Furnace oil (380-660° F.) | 4.9 | 9.4 |
| Naphtha (IBP 380° F.) | 0.8 | 2.2 |
| Gas | 5.4 | 5.4 |
| Chemical hydrogen consumption, S.c.f./bbl. | 476 | 617 |
| Hydrogen sulfide, S.c.f./bbl. | 139 | 127 |

[1] Kuwait 50% reduced crude.
[2] 1/32 inch diameter NiCoMo on alumina extrudates having 0.5 wt. percent nickel, 1.0 wt. percent cobalt and 8.0 wt. percent molybdenum, a surface area of 200 m.²/g. and a pore volume of 0.5 cc./g.
[3] 1/16 inch diameter NiCoMo on alumina extrudates.

The charge and product inspections for the test employing the 1/32 inch catalyst are as follows:

|  | Charge | Product bottoms |
|---|---|---|
| Gravity, ° API | 14.6 | 20.1 |
| Sulfur, percent by wt | 4.07 | 1.03 |
| Nitrogen, percent by wt | 0.22 | 0.17 |
| Carbon residue, percent by wt | 8.59 | 4.97 |
| Nickel, p.p.m. | 16 | 5.1 |
| Vanadium, p.p.m. | 55 | 9.3 |
| Heat of comb, B.t.u./lb | 18,360 | 19,094 |
| Distillation (° F.), vacuum at— |  |  |
| 10% | 715 | 716 |
| 30% | 809 | 807 |
| 50% |  | 918 |
| 60% |  | 982 |
|  |  | CR at 995 |

The 660° F.+ residual oil product inspections for the 1/16 inch catalyst test are as follows:

Gravity: ° API _______________________________ 21.4
Sulfur: percent _______________________________ 1.08
Nitrogen: percent _____________________________ 0.17
Pour point, D97: ° F. _________________________ 65
Viscosity, kin., D445: cs.:
  122° F. ____________________________________ 104.9
  210° F. ____________________________________ 16.36
Carbon residue, rams. D524: percent by wt. _____ 4.86
Vanadium, p.p.m. _____________________________ 14
Nickel, p.p.m. _______________________________ 6.8
Flash point, D93: ° F. ________________________ 390
Distillation (° F.), vacuum, D1160, at—
  10% _______________________________________ 719
  30% _______________________________________ 788
  50% _______________________________________ 874
  70% _______________________________________ 1010
  90% _______________________________________ ____

EXAMPLE 5

Tests were made to show the effect of temperature upon liquid yield in a hydrodesulfurization process. The tests were made in a pilot plant equipped with a four-bed 2254 cc. adiabatic reactor. Reactor charge gas was used as quench between the catalyst beds for temperature control. The charge stock passed through a cotton fiber cartridge filter before it was preheated and charged to the reactor. The filter which was at steam tracing temperature takes out most of any solid contaminants in the feed, but does very little in removing any small size particles or organically combined metals present in the charge stock.

The reactor effluent flowed into a high pressure separator where hydrogen-rich gas was separated from the hydrocarbon liquid. The hydrogen-rich gas was scrubbed with 3 percent to 5 percent diethanolamine and water and recycled to the reactor. After high pressure separation of high pressure hydrogen-containing gas, the liquid product flowed to distillation towers where gases, naphtha, furnace oil, and residual were removed from the unit.

The charge to the unit was a 50 percent Kuwait reduced crude. The operation was designed to produce a 660° F.+ product having a 1.0 percent sulfur level. The catalyst was 1/16 inch extruded NiCoMo on alumina. The operating conditions were 2500 pounds per square inch gauge total pressure, 1.1 liquid hourly space velocity and 5000 s.c.f./bbl. of 80 percent hydrogen with recycle gas quench as required for temperature control. The results of the tests are illustrated in FIG. 4 and in the following data.

Catalyst _____________________________________ (1)
Age: Days at this measurement _________________ 45.9
Bbl./lb. _____________________________________ 4.43
Space velocity: LHSV _________________________ 1.1
Average reactor temp., ° F. ___________________ 760
Reactor gas:
  Inlet:
    S.c.f./bbl. _______________________________ 5008
    Percent H₂ ________________________________ 82
  Quench:
    S.c.f./bbl. _______________________________ 2920
    Percent H₂ ________________________________ 82
Reactor pressure: p.s.i.g. ____________________ 2500
Hydrogen consumption: s.c.f./bbl. _____________ 623
Product yields:
  H₂S ___________________________Percent by weight__ 3.4
  C₁ ____________________________________do____ 0.2
  C₂ ____________________________________do____ 0.1
  C₃ ____________________________________do____ 0.2
  C₄ ____________________________________do____ 0.2
  C₅—380° F. ___________________________do____ 1.5
  380—460° F. __________________________do____ 1.4
  460—600° F. __________________________do____ 2.8
  600—660° F. __________________________do____ 2.5
  660° F.+ _____________________________do____ 88.6

[1] NiCoMo on alumina having 0.97 wt. percent cobalt, 8.6 wt. percent molybdenum and 0.59 wt. percent nickel.

EXAMPLE 6

Tests were conducted to illustrate the effect of a change in hydrogen partial pressure upon the temperature required to hydrodesulfurize a reduced crude to 1 percent sulfur in the residual product. The comparative tests were performed by, in one case, not recycling hydrogen containing light hydrocarbons which build up in the hydrogen stream and reduce the partial pressure of the hydrogen in the stream but instead charging to the hydrodesulfurizer only fresh hydrogen charge having a uniform hydrogen purity. In the other case, a recycle hydrogen stream which was not subjected to naphtha scrubbing to remove light hydrocarbons so that the hydrogen partial pressure therein continually decreased throughout the test was recycled to the hydrodesulfurizer. The reactor system catalyst and operating conditions for both tests are generally the same as that described in the tests of Example 4. The results are illustrated in FIG. 3. The solid line in FIG. 3 represents the test utilizing only fresh hydrogen at 1830–1850 pounds per square inch of hydrogen pressure. The broken line in FIG. 3 represents the test wherein non-naphtha scrubbed recycle gas is recycled causing hydrogen partial pressure to continually decrease so that at the last data point shown the hydrogen partial pressure was 1720–1740 pounds per square inch. The following data are representative of the test represented by the broken line.

| | |
|---|---|
| Oil charge | (1) |
| Catalyst | (2) |
| Volume, cc. | 2296 |
| Weight, grams | 1771 |
| Age, days at time of this measurement | 7.2 |
| Throughput, vol. oil per vol. cat. | 96 |
| Reactor bed temp. ° F.: (inlet, outlet) | 668, 690 |
| Operating conditions: | |
|   Reactor pressure, p.s.i.g. | 2058 |
|   Avg reactor temp., ° F. | 676 |
|   Space velocity: | |
|     Vol./hr./vol. | 0.53 |
|     Wt./hr./wt. | 0.66 |
|   Reactor gas charge: | |
|     S.c.f./bbl. | 4462 |
|     Percent $H_2$ | 88 |
|   Makeup gas: | |
|     S.c.f./bbl. | 587 |
|     Percent $H_2$ | 94 |
|   Recycle gas: | |
|     S.c.f./bbl. | 3874 |
|     Percent $H_2$ | 85 |
| Product yields, wt. percent: | |
|   Stripper bottoms | 92.5 |
|   Furnace oil | 4.7 |
|   Naphtha | 0.6 |
|   Gas | 3.7 |
| Net hydrogen sulfide, s.c.f./bbl. | 108 |

[1] 50 percent Kuwait reduced crude.
[2] 1/32 inch NiCoMo on alumina.

| | Charge oil | Stripper bottoms |
|---|---|---|
| Gravity: °API | 15.7 | 20.6 |
| Viscosity, SUS D2161: | | |
|   100° F | 4,906 | 2,181 |
|   210° F | 171.8 | 114.8 |
| Carbon, wt. percent | 84.52 | 85.52 |
| Hydrogen, wt. percent | 11.43 | 11.68 |
| Nitrogen, wt. percent | 0.20 | 0.17 |
| Sulfur, wt. percent | 4.06 | 11.1 |
| Carbon residue, wt. percent | 8.16 | 5.12 |
| Nickel, p.p.m | 16 | 4.7 |
| Vanadium, p.p.m | 54 | 6.1 |
| Heat of Combustion, B.t.u./lb | 18,423 | 19,908 |
| Distillation, vacuum, percent at ° F.: | | |
|   5 | 608 | 654 |
|   10 | 674 | 682 |
|   20 | 762 | 750 |
|   30 | 829 | 807 |
|   40 | (1) | 866 |
|   50 | | 925 |
|   60 | | 992 |
| | | (2) |

[1] Cr. at 888. [2] Cr. at 1,011.

EXAMPLE 7

Simulation experiments were conducted to show the effect of catalyst particle size on pressure drop in hydrodesulfurization process in reactors of various diameters. All tests were made with the same liquid hourly space velocity in a single bed reactor, charging a 75 percent reduced Kuwait crude, using recycle hydrogen and maintaining a hydrogen purity of 77 percent, using reactor inlet and outlet temperatures of 780 and 815° F., respectively, a reactor inlet pressure of 2500 p.s.i.g., and a 1.0 liquid hourly space velocity. Three series of tests were made utilizing reactors of various diameters with 1/2 inch, 1/16 inch and 1/32 inch NiCoMo on alumina catalyst particles. The results are illustrated in FIG. 2.

Figure 7:
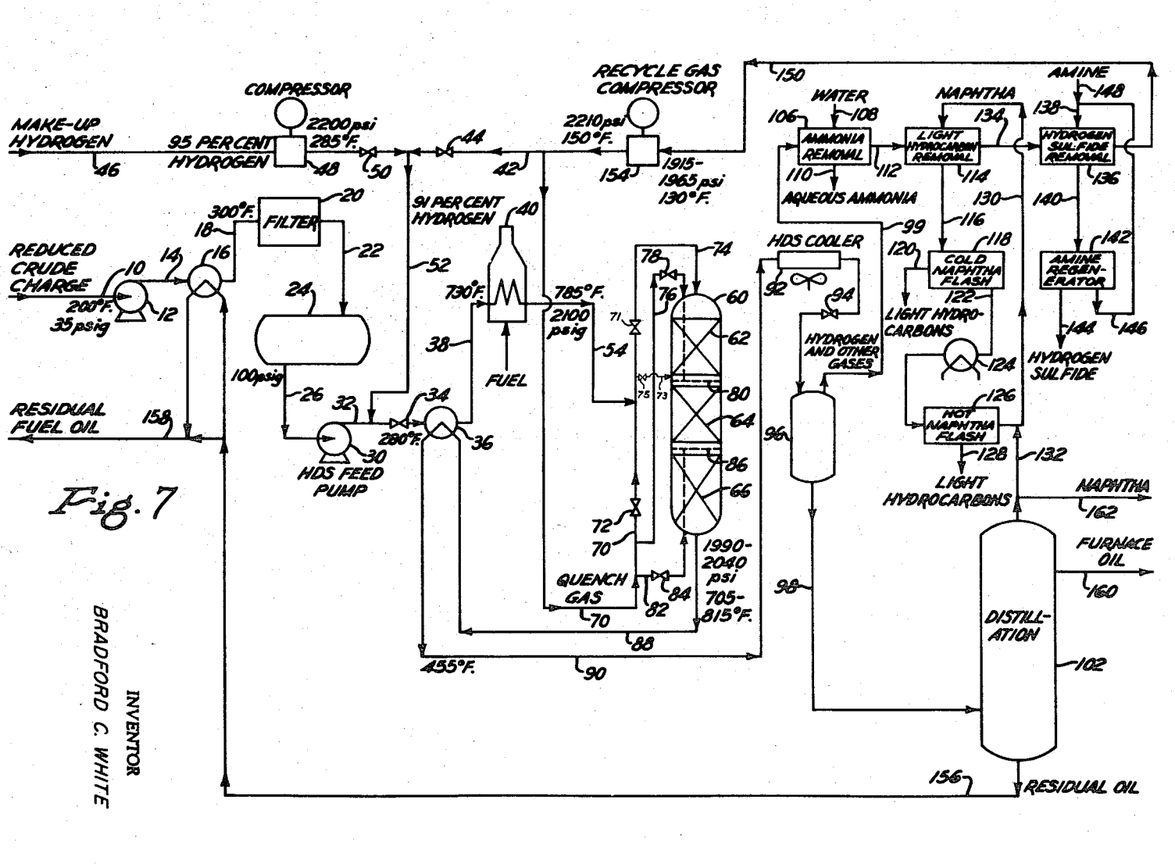

The following description of the process of this invention is made in reference to FIG. 7. FIG. 7 itself indicates suitable temperature and pressure conditions at various points in the process, and these indicated conditions are not reiterated in the following description.

Referring to FIG. 7, a full crude or a reduced crude, such as a 50 percent reduced Kuwait crude which contains the entire asphaltene content of the full crude and therefore also contains substantially all of the nickel, vanadium and sulfur content of the full crude, is charged to the process through line 10 and is pumped by pump 12 through line 14, preheater 16, line 18, solids filter 20 and line 22 to drum 24. From drum 24 the liquid oil charge is passed through line 26 to feed pump 30.

Liquid from pump 30 is admixed with hydrogen from line 52 and passed through line 32, valve 34, preheater 36, line 38 and furnace 40. Liquid flow valve 34 is disposed in a nonfully preheated liquid hydrocarbon line but no valves are utilized in any fully preheated liquid hydrocarbon lines because at the reaction temperatures of this invention if any hydrocarbon should descend into any indentation or crevice of a valve and become stagnant therein for even a brief period of time without full exposure to hydrogen, coking would occur and render the valve inoperative. Therefore, there is no other valve in any liquid line in the vicinity of the reactor until the hot reactor liquid has been cooled downstream from the reactor, as will be shown subsequently.

A mixture of fresh and recycle hydrogen is introduced into the liquid charge to the reactor prior to preheating thereof. Recycle hydrogen is admitted to the liquid charge through line 42 and valve 44. Makeup hydrogen is charged through line 46, compressor 48 and valve 50. A mixture of fresh and recycle hydrogen is introduced to the relatively cool liquid charge through line 52.

The preheated mixture of liquid charge and hydrogen is charged through line 54 and thence to reactor 60 containing fixed catalyst beds 62, 64 and 66. The catalyst beds each contain NiCoMo on alumina catalyst as 1/32 inch extrudates which have the following typical specifications:

| | |
|---|---|
| Surface area meters$^2$/gram | 150 |
| Pore volume in 50–300 A. radius | [1] 60 to 90 |
| Pore volume cc./gram | 0.5 to 0.8 |
| Compacted density grams/cc | 0.45 to 0.65 |
| Specific volume of pores cc./100 cc | 30–40 |

[1] Percent of total pore volume.

Each succeeding catalyst bed has a larger volume than the bed just prior to it. If desired there can be four, five, six or more catalyst beds in the reactor. Also, if desired, each reactor bed can have 25 percent, 50 percent, 100 percent, or more, catalyst than the bed just prior to it.

The hydrocarbon feed is admixed with a temperature quenching hydrogen stream charged through line 70 and valve 72 so that a quenched hydrocarbon and hydrogen stream is charged to the reactor at start-up through line 73 and valve 75, valve 71 being closed. The hydrocarbon and hydrogen stream is passed downwardly through fixed catalyst beds 64 and 66 for an extended duration. Well in advance of the time that possible encrustation occurs at the top of bed 64, valve 71 is opened and valve 75 is closed so that the hydrocarbon and hydrogen stream is now charged to the top of reactor bed 62 through line 74. Throughout the operation quench hydrogen valve 84 is open, but quench hydrogen valve 78 is closed until valve 71 is opened.

The reaction stream is now passed through catalyst bed 62 and due to the exothermic nature of the hydrodesulfurization reaction it is heated in passage therethrough and is quenched by recycle hydrogen entering through line 76, valve 78, and sparger 80. The cooled reaction stream is then passed through catalyst bed 64 wherein it increases in temperature so that it is then cooled by a quenching hydrogen stream entering through line 82, valve 84 and sparger 86. Temperatures between the various catalyst beds are controlled by regulating the valves in the various hydrogen quench lines to apportion hydrogen recycle flow. Finally, the reaction mixture passes through catalyst bed 66 and then leaves the reactor in a desulfurized condition through line 88. The reactor effluent stream then gives up some heat at charge preheater 36 and passes through line 90 to air cooler 92 where the effluent is sufficiently cooled so that the valve 94 can be utilized. Because it is disposed after the air cooler, valve 94 is the first valve in a liquid-containing line downstream from the reactor which can be employed without the danger of coking therein rendering the valve inoperative. Reactor effluent enters flash chamber 96 whence desulfurized liquid is discharged through line 98 to a distillation column 102. A gaseous stream comprising primarily hydrogen together with ammonia and hydrogen sulfide formed by nitrogen and sulfur removal from the charge and light hydrocarbons formed by thermal hydrocracking of some of the charge is discharged from flash chamber 96 through line 99.

The gaseous effluent stream passes through unit 106 to which water is added through line 108 and from which aqueous ammonia is removed through line 110. The gaseous effluent from unit 106 is passed through line 112 to light hydrocarbon wash unit 114 to which naphtha from distillation column 102 is pumped in order to wash light hydrocarbons from the hydrogen stream. The wash naphtha is removed through line 116 and passed to flash chamber 118 where some of the dissolved hydrocarbons are flashed off through line 120. Then the naphtha is passed through line 122, heater 124 and hot naphtha flash chamber 126 from which additional light hydrocarbons are flashed through line 128. The regenerated naphtha is recycled through line 130 wlith makeup naphtha entering through line 132.

The hydrogen stream is then passed through line 134 to hydrogen sulfide removal unit 136 to which an amine such as monoethanolamine is added through line 138. Hydrogen sulfide-rich amine is removed through line 140 and passed to amine regenerator 142 from which hydrogen sulfide is discharged through line 144 and recycle amine exits through line 146. Makeup amine is charged through line 148. A recycle hydrogen stream is then returned to the reactor through line 150.

It is important to remove a substantial amount of the ammonia, hydrogen sulfide and light hydrocarbons from the hydrogen stream prior to recycle because these gases reduce the partial pressure of hydrogen in the reactor. It is the partial pressure of hydrogen rather than the total pressure in the reactor which affects hydrodesulfurization activity. It is not possible to arbitrarily increase total hydrogen pressure in the reactor to compensate for a low hydrogen partial pressure because of severe design pressure limitations in the reactor, as explained above. The recycle hydrogen passes through compressor 154 for increasing the pressure of the hydrogen stream to the reactor.

Hydrodesulfurized residual oil is removed from distillation column 102 through line 156 and is used to supply heat to inlet crude oil heat exchanger 16 prior to its discharge from the system through line 158. Hydrodesulfurized furnace oil is removed from the distillation column through line 160 while naphtha product is removed from the system through line 162.

Figure 8:
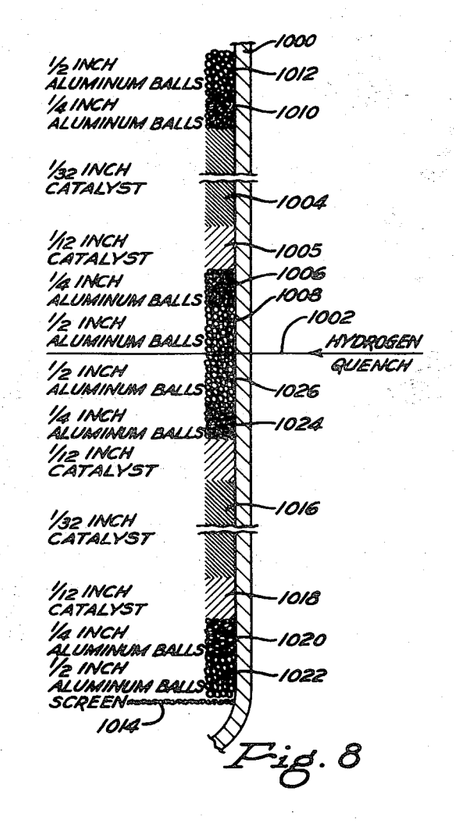

FIG. 8 is a cutaway segment of a multibed reactor in which the lower two catalyst beds are shown. FIG. 8 shows that a start-up bed of the small size catalyst of the preferred embodiment of the present invention can be prepared in a manner to secure the particles from excessive relative movement and to prevent the particles from producing fines and plugging screens, both of which conditions would greatly increase the pressure drop in the reactor and tend to further nullify the temperature advantage of the small size catalyst particles.

FIG. 8 shows a steel reactor wall 1000 which may be 7 to 10 inches thick. One bed of catalyst lies above hydrogen quench line 1002 and another catalyst bed lies below this line, each bed filling the entire cross-section of the reactor. The greatest volume of the upper bed comprises $\frac{1}{32}$ inch catalyst bed 1004 which rests upon a smaller bed of $\frac{1}{12}$ inch catalyst 1005 and $\frac{1}{4}$ inch aluminum balls 1006 which in turn rests upon a bed of $\frac{1}{2}$ inch aluminum balls 1008. Beds 1005, 1006 and 1008 prevent the $\frac{1}{32}$ inch catalyst particles from surrounding and plugging the sparger openings of hydrogen quench line 1002. Above catalyst bed 1004 is a bed 1010 of $\frac{1}{4}$ inch aluminum balls and a bed 1012 of $\frac{1}{2}$ inch aluminum balls. These latter two beds contribute stabilizing weight to the $\frac{1}{32}$ inch catalyst bed to prevent shifting of particles therein during flow of reacants, which shifting would tend to cause catalyst disintegration and fines formation and thereby greatly enhance pressure drop through the $\frac{1}{32}$ inch bed.

The lower bed of catalyst rests upon screen 1014. Screen 1014 is protected from plugging by $\frac{1}{32}$ inch catalyst bed 1016 by a gradual increase in particle size between it and the $\frac{1}{32}$ inch catalyst bed as indicated by $\frac{1}{12}$ inch catalyst bed 1018, $\frac{1}{4}$ inch aluminum balls bed 1020 and $\frac{1}{2}$ inch aluminum balls bed 1022. Proper distribution of hydrogen and liquid reactant as they approach lower catalyst bed 1016 is insured by bed 1024 of $\frac{1}{4}$ inch aluminum balls and bed 1026 of $\frac{1}{2}$ inch aluminum balls.

I claim:

1. The process for the hydrodesulfurization of a crude oil or a reduced crude oil containing the asphaltene fraction of the crude comprising passing a mixture of hydrogen and said crude oil downflow through a fixed bed of supported Group VI and Group VIII metal hydrodesulfurization catalyst, said asphaltene fraction containing metals which deposit as solids on said catalyst, the particles in said catalyst bed being between about $\frac{1}{20}$ and $\frac{1}{40}$ inches in diameter, said particle size range permitting hydrodesulfurization at a lower temperature than is required with a catalyst particle size above this range but inducing a considerably higher pressure drop tending to prevent said low temperature advantage under reactor inlet pressure limitations, and retarding excessive pressure drop during said process by starting said process with only a portion of the total catalyst required for a catalyst cycle and subsequently adding fresh catalyst with said crude oil to the inlet region of the catalyst bed without removing any catalyst during said process so that deposited solids are distributed through an enlarged portion of the bed depth rather than only at an upper layer of the bed.

2. The process of claim 1 wherein said fresh catalyst is added intermittently during said process.

3. The process of claim 1 wherein the catalyst comprises nickel-cobalt-molybdenum on alumina.

4. The process of claim 1 wherein the fresh catalyst is added without interrupting operation of said process.

5. A process for the hydrodesulfurization of a crude oil or a reduced crude oil containing the asphaltene fraction of the crude comprising charging a mixture of hydrogen and said crude oil downflow through a fixed bed of catalyst particles at an inlet pressure no greater than about 3000 p.s.i.g. through a supported Group VI and Group VIII metal hydrodesulfurization catalyst, said asphaltene fraction containing metals which deposit as solids on said catalyst, the particles in said catalyst bed being between about 1/20 and 1/40 inches in diameter, said particle size range permitting hydrodesulfurization at a lower temperature than is required with a catalyst particle size above this range but inducing a considerably higher pressure drop tending to prohibit said low temperature advantage under reactor inlet pressure limitations, and retarding excessive pressure drop during said process by starting said process with only a portion of the total catalyst required for a catalyst cycle and subsequently adding fresh catalyst to the inlet region of the catalyst bed together with said crude oil without removing any catalyst during said process so that deposited solids are distributed through an enlarged portion of the bed depth rather than only at an upper layer of the bed.

References Cited

UNITED STATES PATENTS

| | | | |
|---|---|---|---|
| 2,361,978 | 11/1944 | Swearingen | 208—120 |
| 2,880,171 | 3/1959 | Flinn et al. | 208—216 |
| 3,067,129 | 12/1962 | Dauber et al. | 208—140 |
| 3,278,417 | 10/1966 | Van Driesen | 208—108 |
| 3,383,301 | 3/1968 | Beuther et al. | 208—216 |
| 3,429,801 | 2/1969 | Gleim et al. | 208—216 |
| 3,117,073 | 11/1964 | Hertwig et al. | 208—65 |
| 2,245,145 | 6/1941 | Hall et al. | 23—288 |
| 2,257,178 | 9/1941 | Martin et al. | 208—146 |
| 2,289,063 | 7/1942 | Ocon et al | 208—49 |
| 2,629,684 | 2/1953 | Leffer | 208—147 |
| 2,587,149 | 2/1952 | Gwynn | 208—213 |
| 3,509,043 | 4/1970 | McMaster et al. | 208—146 |

HERBERT LEVINE, Primary Examiner

U.S. Cl. X.R.

208—146, 216; 23—1 E; 252—477